US012107639B2

(12) United States Patent
Budic et al.

(10) Patent No.: US 12,107,639 B2
(45) Date of Patent: Oct. 1, 2024

(54) SYSTEM OF MORPHOLOGY RECOGNITION FOR OPTIMIZING RF PROPAGATION MODEL

(71) Applicant: Telefonaktiebolaget LM Ericsson (publ), Stockholm (SE)

(72) Inventors: Miroslav Budic, Murphy, TX (US); Yimin Nie, Saint-Laurent (CA); Aydin Sarraf, Saint-Laurent (CA); Taesuh Park, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 221 days.

(21) Appl. No.: 17/754,208

(22) PCT Filed: Oct. 16, 2020

(86) PCT No.: PCT/IB2020/059738
§ 371 (c)(1),
(2) Date: Mar. 25, 2022

(87) PCT Pub. No.: WO2021/074868
PCT Pub. Date: Apr. 22, 2021

(65) Prior Publication Data
US 2022/0329331 A1  Oct. 13, 2022

Related U.S. Application Data

(60) Provisional application No. 62/923,266, filed on Oct. 18, 2019.

(51) Int. Cl.
*H04B 17/391* (2015.01)
*H04B 17/373* (2015.01)

(52) U.S. Cl.
CPC ....... *H04B 17/3913* (2015.01); *H04B 17/373* (2015.01)

(58) Field of Classification Search
CPC .................. H04B 17/3913; H04B 17/373
See application file for complete search history.

(56) References Cited

U.S. PATENT DOCUMENTS

2016/0205560 A1\* 7/2016 Hyslop ............. H04B 7/18504
455/454
2017/0064278 A1\* 3/2017 Posselius .................. G06T 5/50
(Continued)

FOREIGN PATENT DOCUMENTS

WO  2019066470 A1  4/2019

OTHER PUBLICATIONS

International Search Report and Written Opinion for Application No. PCT/IB2020/059738, dated Jan. 21, 2021, 14 pages.

*Primary Examiner* — Natasha W Cosme
(74) *Attorney, Agent, or Firm* — Nicholson De Vos Webster & Elliott LLP

(57) ABSTRACT

A method and network node for determining a Radio Frequency (RF) propagation model for a coverage area from an image view of the coverage area. The method selects a coverage area for a transmission point of a transmitter and obtains an image view of the selected coverage area. The method further recognizes, from a plurality of morphology types, a morphology type for the selected coverage area from the obtained image view using a machine learning model; and determines a RF propagation model for the selected coverage area based on the recognized morphology type.

16 Claims, 10 Drawing Sheets

(56) References Cited

U.S. PATENT DOCUMENTS

| | | |
|---|---|---|
| 2017/0206648 A1 | 7/2017 | Marra et al. |
| 2019/0261193 A1 | 8/2019 | Torsner et al. |
| 2019/0320327 A1* | 10/2019 | Lee ...................... G06V 20/176 |
| 2020/0304219 A1* | 9/2020 | Park ...................... H04B 17/309 |

* cited by examiner

Normalized Confusion Matrix

| True Label \ Predicted Label | SB_HF_MIX | DB_LF_* | MB_LF_* | SB_HF_CON | SB_HF_DEC | SB_MF_CON | DB_HF_* | SB_MF_MIX | SB_MF_DEC | MB_HF_* |
|---|---|---|---|---|---|---|---|---|---|---|
| SB_HF_MIX | 0.80 | 0.00 | 0.00 | 0.10 | 0.05 | 0.00 | 0.00 | 0.05 | 0.00 | 0.00 |
| DB_LF_* | 0.00 | 1.00 | 0.00 | 0.00 | 0.00 | 0.00 | 0.00 | 0.00 | 0.00 | 0.00 |
| MB_LF_* | 0.00 | 0.05 | 0.85 | 0.00 | 0.00 | 0.00 | 0.00 | 0.00 | 0.05 | 0.05 |
| SB_HF_CON | 0.05 | 0.00 | 0.00 | 0.95 | 0.00 | 0.00 | 0.00 | 0.00 | 0.00 | 0.00 |
| SB_HF_DEC | 0.05 | 0.00 | 0.00 | 0.00 | 0.90 | 0.00 | 0.00 | 0.00 | 0.05 | 0.00 |
| SB_MF_CON | 0.05 | 0.00 | 0.00 | 0.15 | 0.00 | 0.75 | 0.00 | 0.05 | 0.00 | 0.00 |
| DB_HF_* | 0.00 | 0.00 | 0.00 | 0.00 | 0.00 | 0.00 | 1.00 | 0.00 | 0.00 | 0.00 |
| SB_MF_MIX | 0.05 | 0.00 | 0.00 | 0.05 | 0.00 | 0.25 | 0.00 | 0.65 | 0.00 | 0.00 |
| SB_MF_DEC | 0.00 | 0.00 | 0.00 | 0.00 | 0.00 | 0.00 | 0.00 | 0.05 | 0.95 | 0.00 |
| MB_HF_* | 0.00 | 0.00 | 0.05 | 0.00 | 0.10 | 0.00 | 0.00 | 0.00 | 0.00 | 0.85 |

SYSTEM OF MORPHOLOGY RECOGNITION FOR OPTIMIZING RF PROPAGATION MODEL

CROSS-REFERENCE TO RELATED APPLICATIONS

This application is a National stage of International Application No. PCT/IB2020/059738, filed Oct. 16, 2020, which claims priority to U.S. Application No. 62/923,266, filed Oct. 18, 2019, which are hereby incorporated by reference.

TECHNICAL FIELD

Embodiments of the disclosure relate to the field of wireless communication; and more specifically, to the use of images to recognize morphology types for selecting a propagation model.

BACKGROUND ART

In the modern cellular network, setting a Radio Frequency (RF) propagation model for each cell is generally indispensable for generating adequate coverage for its sector. Many factors, such as buildings, trees, and landscape, affect the radio propagation pattern of a transmitted signal from a transmission point. This variation may differ from sector to sector. In order to address terrain effects on the propagation signal, radio engineers should understand the morphology type of a given sector and adjust configurations of radio transmitters of a cell station accordingly.

There currently exist certain challenge for achieving the goal above. In one typical practice, companies send experienced radio technicians to a sector, have them recognize the morphology around the transmission point and adjust the configuration of the transmitter on site to adjust the propagation pattern. This approach has worked with networks employing Long-term Evolution (LTE) or earlier radio technologies, because they do not require many cells at a transmission point. One cell and its radio transmitter(s) may cover 1 km or further in range for each sector. Furthermore, the number of sectors covered by a cell is limited with the older technology.

However, with the advent of newer radio technology, such as Fifth Generation (5G) or New Radio (NR) technology, the situation is drastically changing. The newer radio technologies utilize signals in high frequency spectrum bands that result in transmitted signals propagating just 200 m or less, even in an open space. Therefore, 5G/NR networks require far more smaller cells. Furthermore, in order to address shorter range for transmission coverage, 5G/NR networks employ narrower beam-formed directional transmission to enhance gain. The use of narrow beams can increase the number of sectors for a transmission point, which can require many more signal propagation adjustments for the transmission point. The additional propagation adjustments raise a serious challenge for expanding 5G network coverage while suppressing its cost.

SUMMARY

Certain aspects of the present disclosure and their embodiments may provide solutions to challenges noted above. In one aspect of the disclosed system, a method provides for determining a Radio Frequency (RF) propagation model for a coverage area from an image view of the coverage area, wherein the method comprises selecting a coverage area for a transmission point of a transmitter and obtaining an image view of the selected coverage area. The method further provides for recognizing, from a plurality of morphology types, a morphology type for the selected coverage area from the obtained image view using a machine learning model; and determining a RF propagation model for the selected coverage area based on the recognized morphology type.

In a second aspect of the disclosed system, a network node, of a wireless communication network, to determine a Radio Frequency (RF) propagation model from an image view of the coverage area. The network node is configured to select a coverage area for a transmission point of a transmitter and obtain an image view of the selected coverage area. The network node is further configured to recognize, from a plurality of morphology types, a morphology type of the selected coverage area from the obtained image view using a machine learning model; and determine a RF propagation model for the selected coverage area based on the recognized morphology types.

In a third aspect of the disclosed system, a computer program comprising instructions which, when executed by at least one processing circuitry of a network node of a wireless communication network, is capable of determining a Radio Frequency (RF) propagation model for a coverage area from an image view of the coverage area by performing operations. The operations comprise selecting a coverage area for a transmission point of a transmitter and obtaining an image view of the selected coverage area. The program further recognizing, from a plurality of morphology types, a morphology type for the selected coverage area from the obtained image view using a machine learning model; and determining a RF propagation model for the selected coverage area based on the recognized morphology type.

In a fourth aspect of the disclosed system, a carrier containing the computer program according to the third aspect, wherein the carrier is one of an electronic signal, optical signal, radio signal or computer storage medium.

There are, proposed herein, various embodiments which address one or more of the issues disclosed herein. Certain embodiments may provide one or more of the following technical advantage(s). Owing to its nature of automation and machine learning, the disclosed solution can scale up the RF model optimization for all existing and future 5G/NR cells by substituting the current manual and expensive process, which require experienced/expensive RF domain experts to visit the site and determine the RF model. In the era of 5G/NR, this solution is not only a cost saver but also a key enabler of coverage expansion that the carriers demand.

Also, the Machine Learning (ML)-based assignment of propagation models reduces the potential human error caused by subjective assessment, as well as other advantages.

BRIEF DESCRIPTION OF THE DRAWINGS

The present disclosure may best be understood by referring to the following description and accompanying drawings that are used to illustrate embodiments of the present disclosure. In the drawings:

FIG. 7 illustrates an example of a confusion matrix, according to some embodiments of the present disclosure.

DETAILED DESCRIPTION

Figure 1:
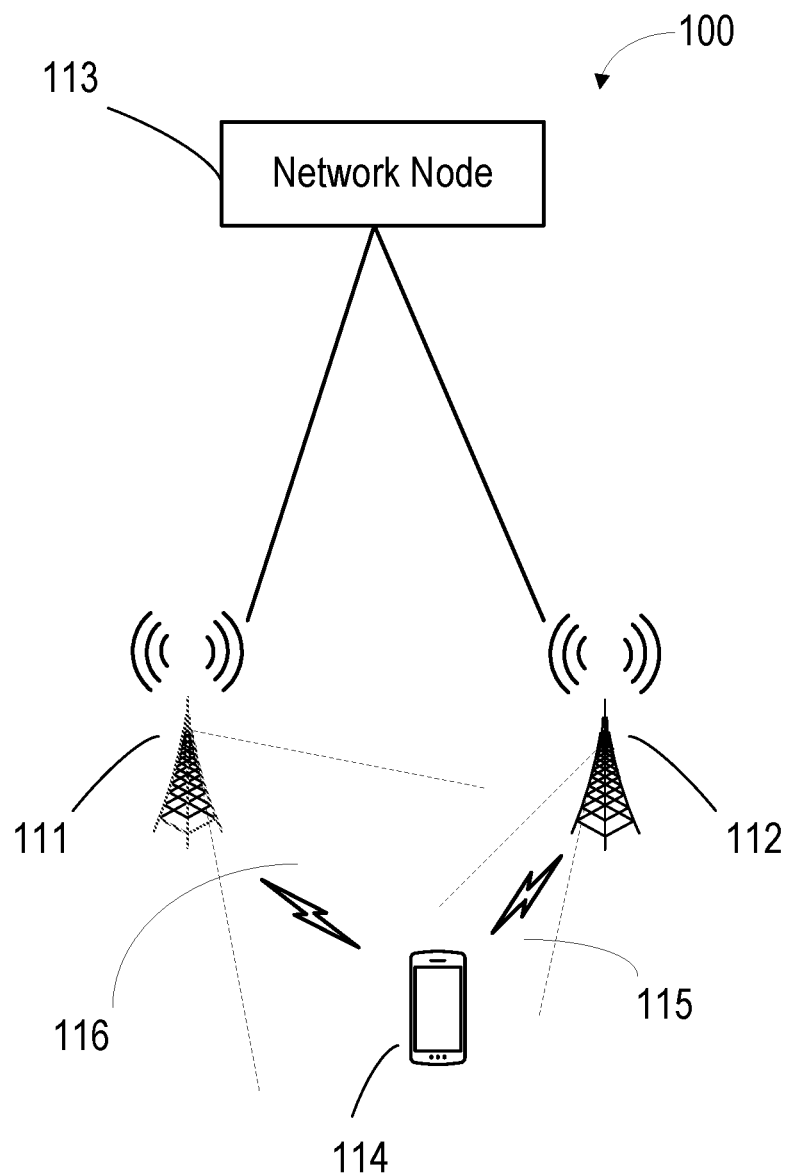
FIG. 1 illustrates a wireless communication network, according to some embodiments of the present disclosure.

The following description describes methods and apparatus for morphology recognition for optimizing a RF propagation model. The following description describes numerous specific details such as operative steps, resource partitioning/sharing/duplication implementations, types of obstacles, types of machine learning models, and interrelationships of system components to provide a more thorough understanding of the present disclosure. It will be appreciated, however, by one skilled in the art that the embodiments of the present disclosure can be practiced without such specific details. In other instances, control structures, circuits, memory structures, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, model, or characteristic is described in connection with an embodiment, it is submitted that it is within the knowledge of one skilled in the art to affect such feature, structure, characteristic, or model in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some of the embodiments contemplated herein apply to wireless communication technology applicable to $5^{th}$ Generation (5G) technology or New Radio (NR) technology under the $3^{rd}$ Generation Partnership Project (3GPP). Some embodiments can apply to older radio technology, such as 2G, 3G, 4G, LTE, etc., as well. The disclosure mentions both coverage area and sector in reference to a transmission point. A sector may be a coverage area, but the coverage area need not necessarily be a sector.

FIG. 1 shows a communication network 100 according to some embodiments of the present disclosure. As noted above, the network 100 can at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1xRTT and High Rate Packet Data (HRPD), just to mention some options. The network 100 may be suitable for providing radio communications meeting one or more of the criteria established by the Next Generation Mobile Networks Alliance for the 5th generation of mobile telecommunications standards (e.g., 5G/NR). In some embodiment, the communication network 100 can be a wireless cellular network.

The network 100 comprises one or more radio access nodes 111 and 112. In FIG. 1, two radio access nodes 112, 114 are shown, but the skilled person will appreciate that any number of radio access nodes may be provided. The radio access nodes 111, 112 can be referred to as base stations, NodeBs, evolved NodeBs (eNB, or eNodeB), gNodeBs, base transceiver stations, Access Point Base Stations (or just Access Points), base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending on the radio access technology and terminology used. The functions of the radio access nodes 111, 112 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

Each radio access node 111, 112 can serve one or more cells of the network 100. Within each cell, wireless devices communicate with the respective radio access node to provide services to users of the devices as will be familiar to those skilled in the art. Each radio access node 111, 112 further communicates with a network node or nodes, such as network node 113 for co-ordination and control, and provide access to other parts of the network 100 or to other external networks, such as the Internet. FIG. 1 shows a wireless terminal device 114 in communication with one or both of radio access nodes 111, 112. The terminal device 114 can be referred as a user equipment (UE), mobile device, mobile terminal device, wireless terminal device, etc. Those skilled in the art will appreciate that wireless signals are transmitted between the radio access node(s) 111, 112 and the terminal device 114 using radio resources which are scheduled by a control node of the network 100, such as network node 113.

FIG. 1 shows two radio access nodes 111, 112, in order to illustrate that the coverage area of radio access nodes can differ. Generally, a transmission coverage area from a transmission point, such as radio access nodes 111, 112, is commonly referred to as a cell. Each cell is typically divided into multiple sectors. The size of each sector can vary depending on the technology employed. Node 111 exemplifies a wide sector 116, which can apply to current practice of using older radio technology. However, with the advent of 5G and/or NR (5G/NR) radio technology, the use of beamforming and directional beaming are necessary. Directional beaming technology, such as under 5G/NR, typically require many more sectors for the coverage area, since the sectors are much narrower, as exemplified by sector 115 for radio access node 112. Some embodiments of the present disclosure consider the need to control more outputs (e.g., separate output for each beam) from a wireless transmission point of a wireless communications network, wherein each such output may have different Radio Frequency (RF) propagation characteristics due to different topographic features (both natural and artificial) over the coverage area. The present disclosure addresses a technique of using machine learning (ML) to identify such topographical features to determine a corresponding RF propagation model.

Figure 2:
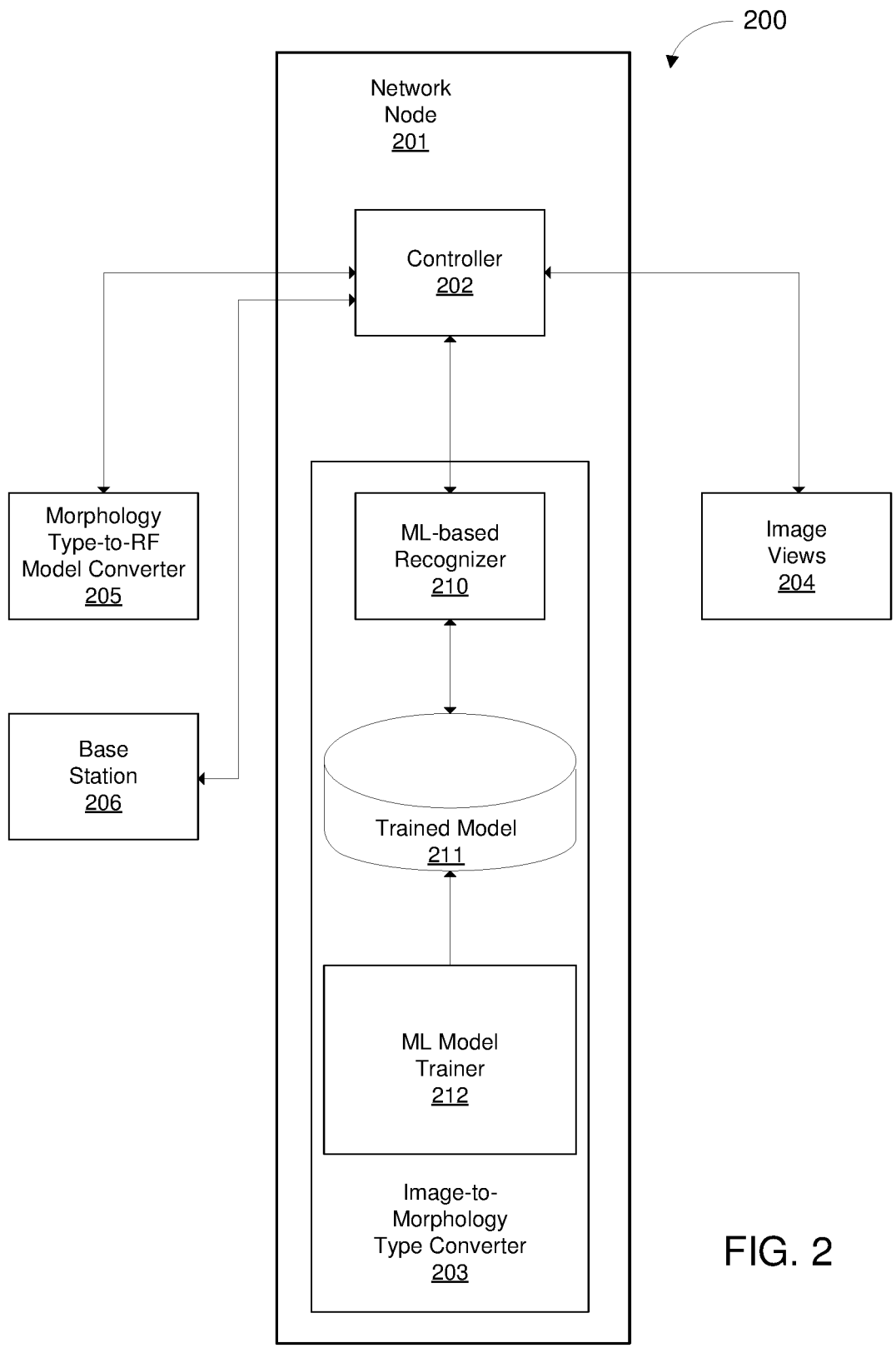
FIG. 2 illustrates a system, according to some embodiments of the present disclosure.

FIG. 2 is a system block diagram 200 according to some embodiments of the present disclosure to achieve a goal of determining RF propagation, including optimizing RF propagation. Usually, module 204, for providing a collection of image views, and base station 206 are separate external entities from network node 201, although one or the other could be part of the network node 201. Likewise, morphology-to-RF model converter 205 may or may not be part of the network node 201. Controller 202 and image-to-morphology type converter 203 are typically part of the network node 201. In some embodiments, module 203 and converter 205 are implemented as software modules. As noted above, the network node 201 can include the morphology-to-RF model converter 205.

The image-to-morphology type converter 203, includes Machine Learning (ML)-based recognizer 210, trained model module 211 and ML model trainer module 213. Optionally, in some embodiments, the module 211 and module 212 can be implemented and executed in a server which can be part of or separate from the network node 201. The network node 201 can be the network node 113 of FIG. 1, or another network node of communication network 100. The network node 201, in some embodiments, can reside at the transmitting point, such as radio access node 111 or 112 of FIG. 1.

Module 204, which is an image provider, includes images (e.g., such as photos and pictures), collected by some means, such as satellites, a drone with cameras, or from a 3rd party aerial image provider (e.g., Google Earth™). Generally, altitude, azimuth, and tilt angle correspond with the images. The images can be associated with addresses, such as geo coordinates. In some embodiments, the collected images provide a slant (e.g., angled) view (such as an aerial slant view) of a predesignated sector of a transmitting point, such as a base station, eNodeB, gNodeB, Access Point (AP), etc. This is explained further below in reference to FIG. 3.

Controller 202 can be a hardware module, software module, firmware module or a combination thereof. In some embodiments, the controller 202 functions as a software module for controlling data flow and task executions. The controller 202, selects a coverage area (e.g., sector) for a given transmission point. The coverage area selected can pertain to a sector of a cell, which sector width varies according to the radio technology implemented (e.g., wide beam or narrow beam-forming). The controller 202 obtains a sector view from the module 204 for the selected sector and feeds the sector view to the image-to-morphology type converter 203. The recognizer 210 predicts the degrees of obstacles from the selected sector view using a trained ML model of module 211. The controller 202 maintains control over the process flow, as well as providing processing capabilities.

The described embodiments below identify three types of obstacles (building, trees, and foliage types) to determine a morphology type from multiple possible morphology types for the sector. The obstacles pertain to the coverage area surrounding the transmission point and pertain to topographical features, natural and/or artificial, that can affect RF propagation. The obstacles and morphology types can vary in other embodiments.

The recognizer module 210 implements ML-based function of a trained model of module 211 to process the image view of the sector. In some embodiments, recognizer module 210 uses a convolution neural network (CNN) or its variants (e.g., DenseNet, XceptionNet, etc.), which receives an image as an input and applies a trained model of module 211. The trained model module 211 is trained by a ML model trainer module 212 by using a dataset, which can be an externally generated dataset. The trainer module 212 can be external to the network node 201. Modules 210, 211, 212 operate together with the controller 202 to recognize a morphology type for the sector from the selected image using a trained ML model. The controller 202 waits and receives the recognized morphology type from the image-to-morphology type converter 203 and feeds the morphology type to the morphology-to-RF model converter 205. The converter 205 uses the received morphology type to determine the desired RF propagation model for the recognized morphology type for the coverage area. The converter 205 has (or has access to) a repository of available RF models for selection. From the multiple RF propagation models available in converter 205, the controller 202 acquires the appropriate (e.g., optimum) RF propagation model. As an alternative, the controller 202 can determine the appropriate propagation model for the coverage area from the morphology type and send a request to the converter 205 to retrieve the appropriate RF propagation model from the repository of RF propagation models. In many instances, the desired RF propagation model is an optimum RF propagation for the transmitter at the transmission point for the sector.

Figure 3:
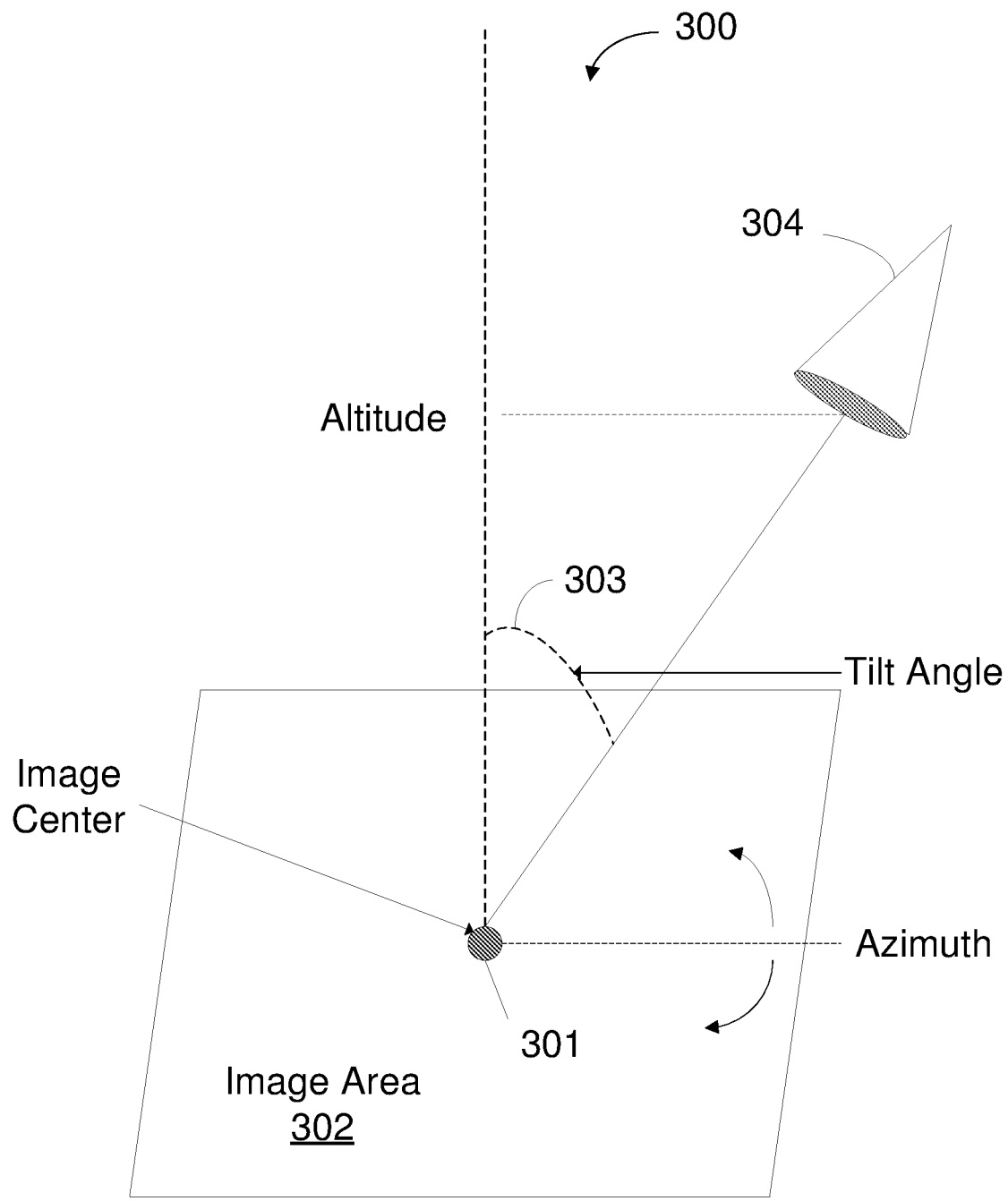
FIG. 3 illustrates a diagram for a slant aerial view of an image, according to some embodiments of the present disclosure.

FIG. 3 is a diagram 300 of explaining the method of capturing a proper aerial view for the purpose of propagation model prediction according to some embodiments of the present disclosure. In order to identify obstacles along the direction of radio propagation in the target sector of 5G/NR coverage, the tilt angle 303 should not be zero. Ideally, the view should be a slant view, and not a top view or a flat side view, of the coverage area in relation to the transmission point 301. The camera height (e.g., altitude) should be sufficiently high to capture the whole sector in one image. In one implementation, the image is obtained with a tilt angle 303 of 60 degree. Altitude, azimuth, and tilt angle can define the viewpoint relative to the image center. For 5G/NR coverage, an image area 302 around the transmission point has a cross-sectional distance of approximately 200 m and the image is obtained looking 304 toward the transmission point as a line-of-sight, slant aerial view with the tilt angle around 60 degrees. As an alternative, the image can be taken looking outward from the transmission point with slant angle.

Figure 4:
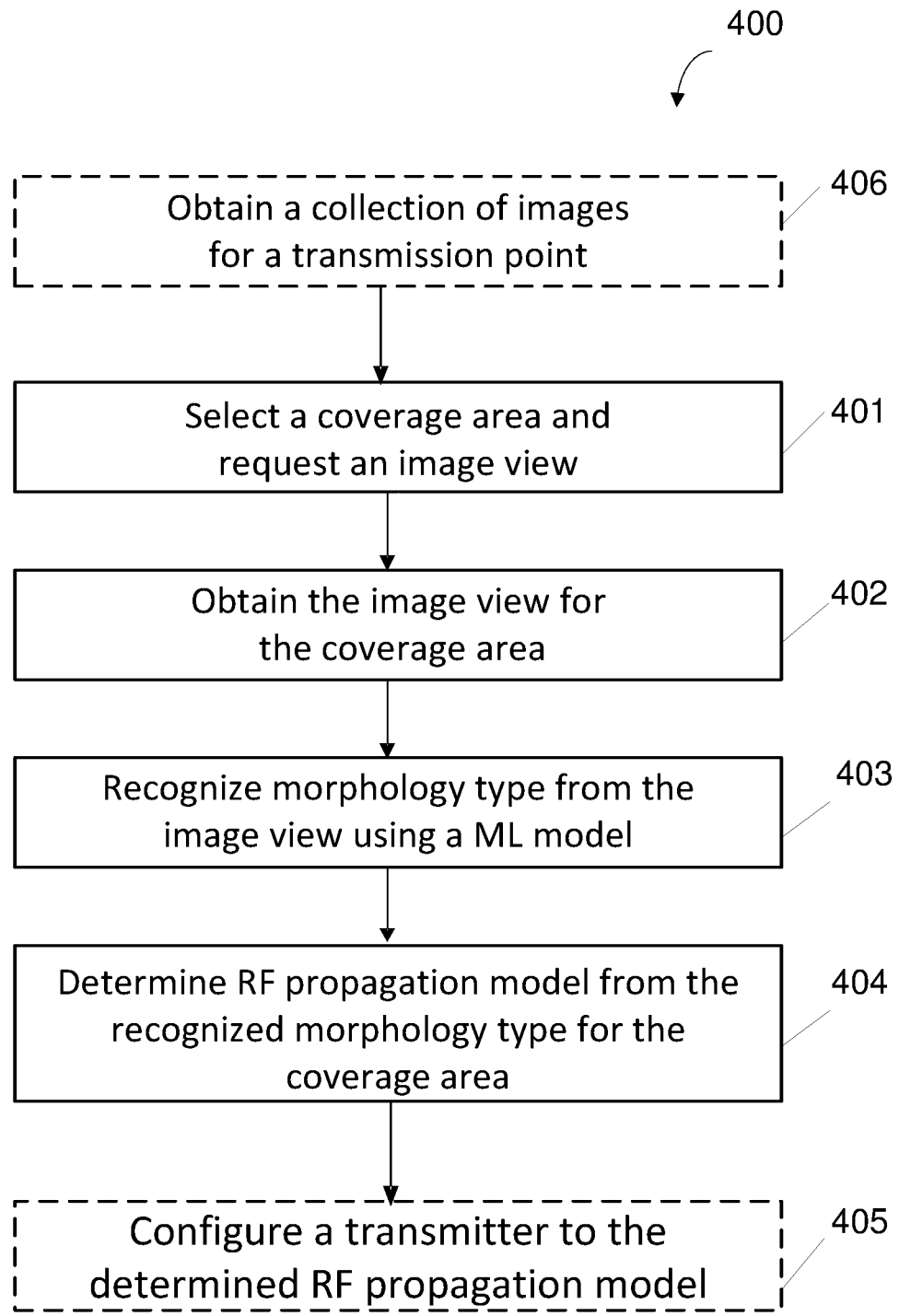
FIG. 4 illustrates a flow diagram for a method of operation, according to some embodiments of the present disclosure.

FIG. 4 is a system flow diagram 400 depicting a method performed by the system of FIG. 2 according to some embodiments. At operation 401, the method selects a coverage area (e.g., sector) for determining RF propagation for a transmission point of a transmitter. The selected sector depends on the type of propagation sought. A sector for a cell of a legacy communication system may have a large width. For directional beaming communication, such as for 5G/NR, the selected sector may have a narrow width to coincide with a narrow beam. Once a sector is selected, a controller (e.g., controller 202) makes a request for that sector to obtain an image (e.g., photos, pictures, etc.) view that correspond to the sector at operation 402. The method, at operation 403, uses the obtained image view to recognize a morphology type, from a plurality of available morphology types, that is most relevant to the image by using a ML-based model. Examples of recognizing the morphology types are described below in reference to FIGS. 5-6. Once the method recognizes an optimal morphology type, the method, at operation 404, determines a RF propagation model for the selected sector. In an optional operation, the method, at operation 405, uses the recognized RF propagation model to configure the transmitter for transmission of signals based on the propagation model.

Furthermore, in an optional operation, the method, at operation 406, is instrumental in collecting various images (e.g., photos, pictures, etc.) corresponding to a transmission point. As earlier stated, the image views for the coverage area are line-of-sight, aerial slant image views of sufficient tilt angle about a transmission point. The images can be collected by means, such as satellites, drones, and placed in an image data set or obtained from $3^{rd}$ party sources and made available for module 204 of FIG. 2.

Figure 5:
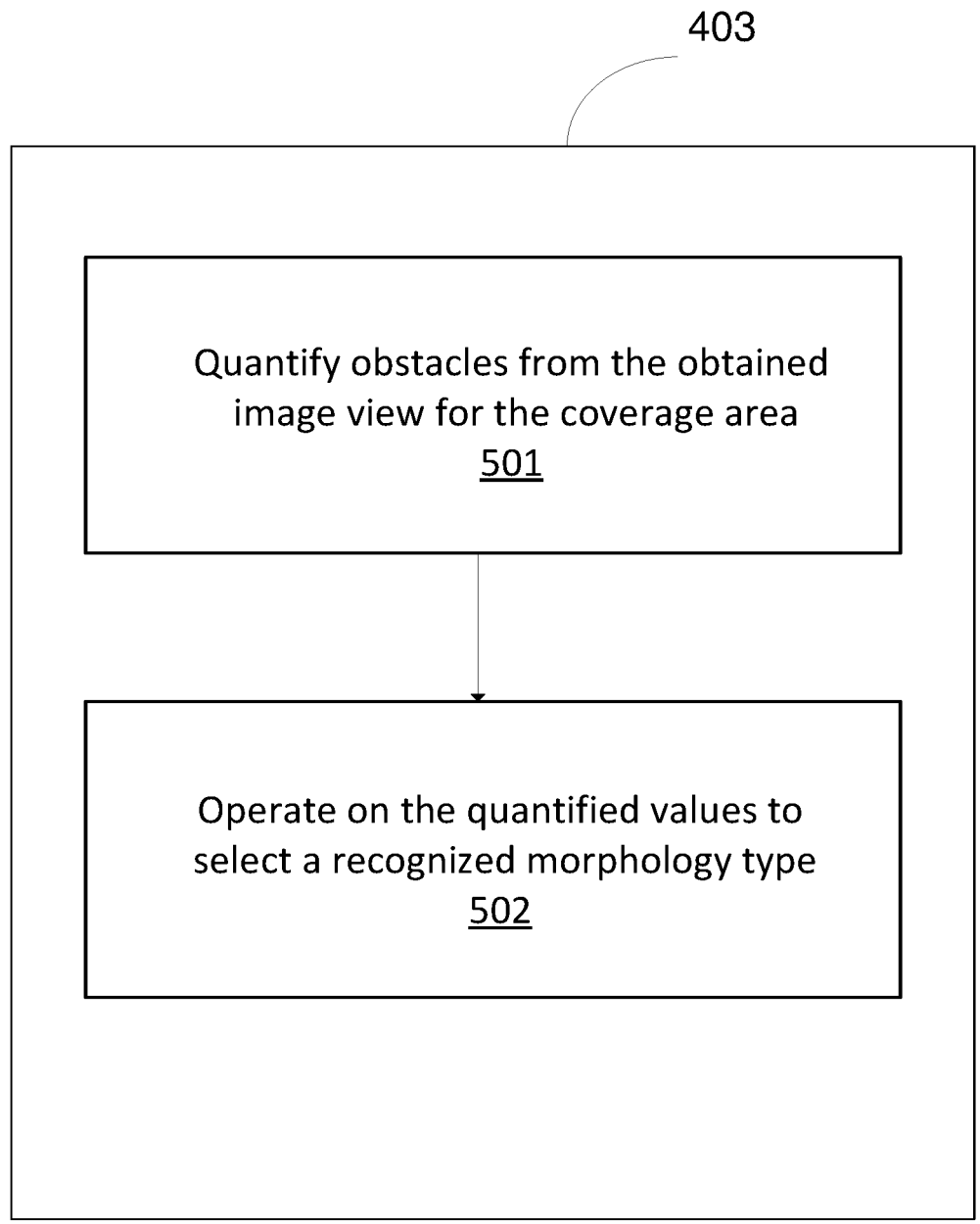
FIG. 5 illustrates a flow diagram extending operations of one of the operations shown in FIG. 4, according to some embodiments of the present disclosure.

FIG. 5 shows a further explanation of the operation 403 that are implemented for some embodiments of the present disclosure. FIG. 5 shows a two-step approach for recognizing a morphology type from the image view using the ML-based model. In the first step at operation 501, the trained module takes the obtained image for the coverage area and attempts to identify different obstacle types and obstacle parameters (e.g., densities) from the image. As noted above as an example, the ML-based model identifies three obstacle types, each obstacle type further identified by three obstacle densities as obstacle parameters. Thus, the ML-based model distinguishes the three obstacle types, based on buildings, trees and foliage, and further by obstacle density parameters. The obstacle types and their obstacle density parameters allow for determination of topographical features from dense urban settings to sparse suburban settings. The three obstacle types with three obstacle density parameters provide for twenty-seven different morphology types, although not all may be utilized for determining the RF propagation model. The parameters can be regarded as sub-types. In some instances, the number of available propagation models for a transmitter can determine the number of morphology types. It is to be noted that other embodiments can use more or lesser number of obstacle types and/or sub-types. Furthermore, other ML-based models may use parameters other than density parameters. The identified obstacle types and respective obstacle densities are quantified, so that quantified values are available for the second step.

In the second step at operation 502, the trained model takes the quantified values and operates on the quantified values to select a recognized morphology type. The ML-based model can be trained to distinguish all twenty-seven different morphology types; however, this can be burdensome or some combinations may be somewhat redundant. Accordingly, training of the ML-based model allows for a selected number of morphology types, which still allows for sufficient distinction to determine RF propagation models.

Figure 6:
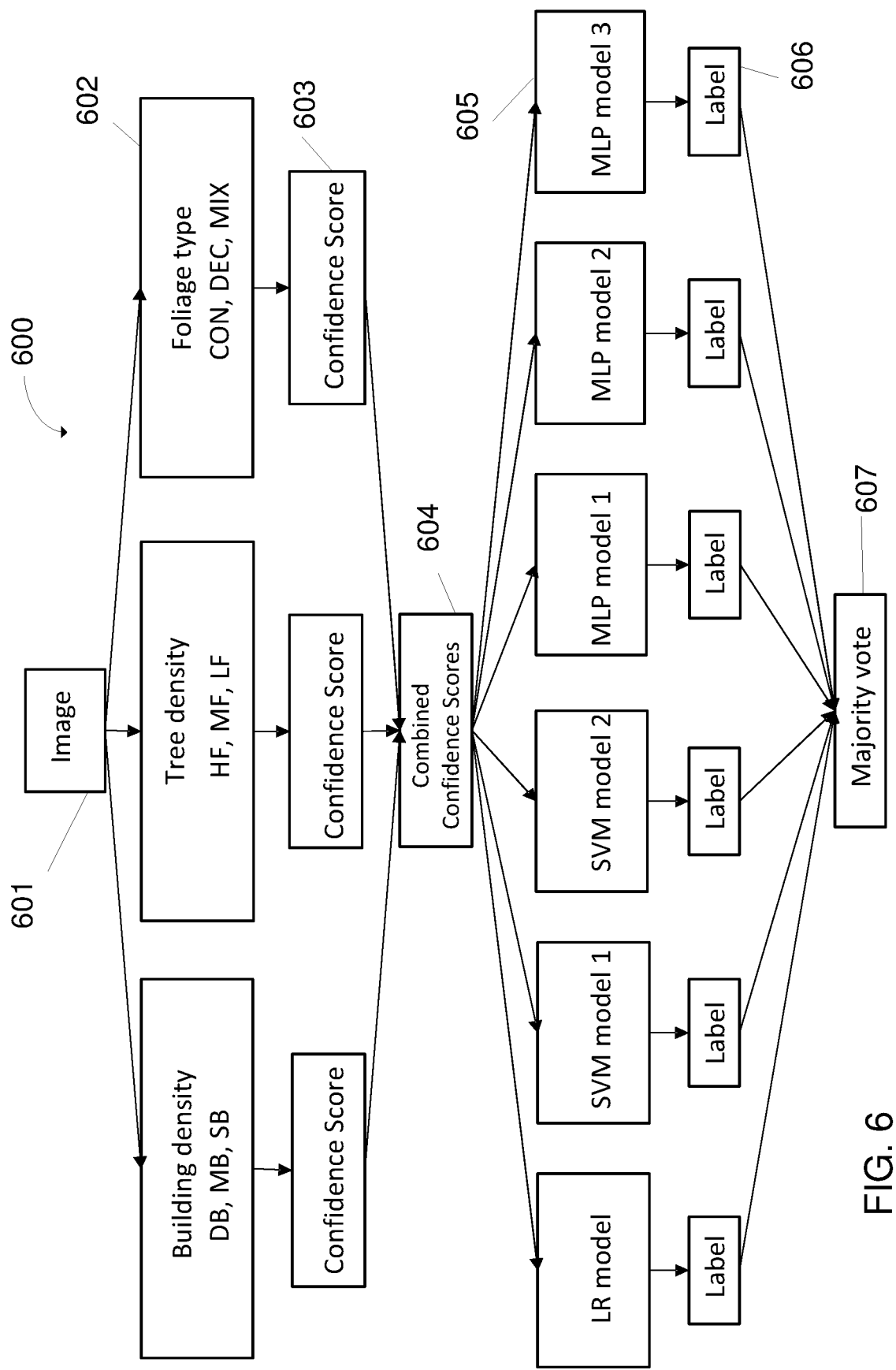
FIG. 6 illustrates a flow diagram of a method for a ML-based model, according to some embodiments of the present disclosure.

FIG. 6 shows an example of implementing a conversion from the three afore-mentioned obstacle types and obstacle parameters (e.g., densities) to a set of selected morphology types, such as customer-defined types, that relate to the RF propagation models of morphology-to-RF model converter 205. In flow diagram 600, the ML-based models perform the operation 501 of FIG. 5 on the obtained image view 601. This results in the ML-based models generating quantified values from the first tier (block levels 602, 603, 604) by the operation of controller 202 and image-to-morphology type converter 203. The operation of the second tier (shown by block levels 605, 606, 607) perform according to operation 502.

The sub-type designation for three obstacle types defined by different levels of obstacle density are:
DB=Dense building (e.g., dense urban)
MB=Medium building (e.g., urban)
SB=Sparse building (e.g., suburban)
HF=High foliage (e.g., high tree density)
MF=Medium foliage (e.g., medium tree density)
LF=Low foliage (e.g., low tree density)
CON=Coniferous
DEC=Deciduous
MIX=Mix of coniferous and deciduous It is to be noted that CON, DEC and MIX are treated in terms of densities for the purpose of different foliage types that affect RF propagation. However, in some embodiments, the parameter(s) associated with one or more obstacle types need not be limited to densities.

The ML-based model using CNN or its variants (e.g., DenseNet, XceptionNet, etc.) separately operate on identifying each of the three obstacle types (building, tree, foliage) and associated obstacle densities as shown at level 602 to generate a quantified value. One type of quantified value is a confidence score(s). The confidence scores can be probability values. Thus, at level 603, the ML-based model generates a confidence score for each of the subtypes (DB, MB, SB) of building density as a confidence score at level 604. The ML-based model generates a confidence score for each of the subtypes (HF, MF, LF) of tree density at level 604. The ML-based model generates a confidence score for each of the subtypes (CON, DEC, MIX) of foliage density. The combined confidence scores at level 604 provides an assessment of the image as a quantified value of the sub-types identified in the image. In one technique, the confidence scores are probability vectors at level 603 which are concatenated into one vector at level 604 as the combined confidence score.

The second tier, commencing at level 605, takes the confidence score of level 604 and performs the operation corresponding to operation 502. For example, if the ML-based model results in a confidence score at level 604, indicating high confidence scores for SB (few buildings), HF (many trees), and DEC (foliage type: deciduous) to predict the sub-types from the image, this confidence score comprised of SUB, HF, and DEC, optionally along with their respective confidence scores, are provided to the second tier.

The second tier comprises a number of different ML-based models at level 605 to determine a morphology type based on the supplied confidence score. Other embodiments can use more or lesser number of ML-based models. Furthermore, other embodiments may use all the same ML-based models or all different ML-based models. As shown in level 605, six ML-based models generate labels according to their own logic at level 606. Although the system of FIG. 6 use three popular ML-based models, LR (Logistic Regression), SVM (Support Vector Machine), and MLP (Multi-Layer Perception) as an example, the system may use another model, such as Random Forest. The shown models are unique names of popular models in the world of machine learning. Diagram 600 shows utilization of multiple models at level 605, of which some are different ML-based models. The quantity and differentiation of ML models allow for sufficient variation to reduce prediction error at the output in determining the correct morphology type.

Each model of level 605 operates on its own to generate a label at level 606. A variety of techniques are available to select the most likely morphology type from the different labels generated. As implemented, a majority vote (e.g., the greatest number of similar labels) from the different models choose the most popular label among the six corresponding labels generated. This lower portion of FIG. 6 shows the conversion which utilizes a mapping table or a pre-trained ML-based model to fit the predicted morphology types to the propagation model label that correspond to a user or customer of the communication system. FIG. 7 shows an example of such fitting.

Although there are twenty-seven possible combinations of subtypes (3×3×3) for the morphology types, in some embodiments a fewer number are actually used for the resulting morphology types. For example, there may be only a certain number of RF propagation models available or some of the combinations may be redundant or irrelevant. Thus, in some embodiments, the models only uses ten morphology types (ten-type) from the combination of three obstacles and their respective obstacle densities at the output. Other implementations may use less or more types with adjusted scope of each type. Because the ML-based models are trainable, such as by a ML model trainer 212, the morphology types at the output are adjustable. Therefore, flexibility can be achieved by a dynamic mapping table or by the retrained ML model.

In some embodiments, the ML-based models of level 605 looks for the following ten-type outputs:
SB_HF_MIX=Sparse Building (Suburban)+High tree density+Mixed
DB_LF_*=Dense Building+Low tree density+(foliage type ignored)
MB_LF_*=Medium building+Low tree density+(foliage type ignored)
SB_HF_CON=Sparse Building (Suburban)+High tree density+CONiferous
SB_HF_DEC=Sparse Building (Suburban)+High tree density+DECiduous
SB_MF_CON=Sparse Building (Suburban)+Medium tree density+CONiferous
DB_HF_*=Dense Building+High tree density+(foliage type ignored)
SB_MF_MIX=Sparse Building (Suburban)+Medium tree density+MIXed
SB_MF_DEC=Sparse Building (Suburban)+Medium tree density+DECiduous
MB_HF_*=Medium Building+High tree density+(foliage type ignored)

FIG. 7 shows one technique for obtaining the 10-type results from the ML-based models according to some embodiments of the present disclosure. FIG. 7 shows a confusion matrix 700, which is a typical method to show the performance of ML models for multi-class classification, of one implementation using ten morphology types as output classes. In the field of machine learning and specifically the problem of statistical classification, a confusion matrix, also known as an error matrix, is a specific table layout that allows visualization of the performance of an algorithm, typically a supervised learning one. Each row/column of the matrix represents the instances in a predicted class while the other column/row represents the instances in an actual class. Thus, a confusion matrix is a special kind of contingency table, with two dimensions ("actual" and "predicted"), and identical sets of "classes" in both dimensions (each combination of dimension and class is a variable in the contingency table). The example confusion matrix shown in FIG. 7 uses the described 10-types from above, listed along the 10 rows and 10 columns. The predicted combination from the selected images is listed along the bottom and the true model for comparison is listed along the left side. For example, one can see that the example implementation can predict the correct RF propagation model for 'SB_HF_CON' obstacle type with 95% of accuracy (e.g., confidence score): See the intersection between X (predicted label) and Y (true label) having the target label. Note that the total sum of row is 1.0, when the confidence scores are based on probabilities.

In the shown confusion matrix, 10-type mapping is an example implementation defining ten different outputs to select ten different RF propagation models for a coverage area (or sector) of a cell station, which allows for an estimate of the best one (optimal) propagation model among the ten. As noted, other embodiments may set the number to other than 10 and such numbers can be different among carriers or spectrum bands. The optimal model obtained at the end has correspondence to a RF propagation model for that coverage area (e.g., sector) at the transmission point.

In reference to FIG. 2, once the network node determines the final ten-type, either the controller 202 selects the corresponding RF propagation model from the morphology type-to-RF model converter 205 based on the ten-type, or send the final ten-type to the converter 205 and let the converter 205 select the corresponding RF propagation model. In some embodiments, a popular decision tree-based ensemble model called Random Forest allows for the selection of the RF propagation model. The selected RF propagation model can then configure the transmitter, such as base station 206.

Figure 8:
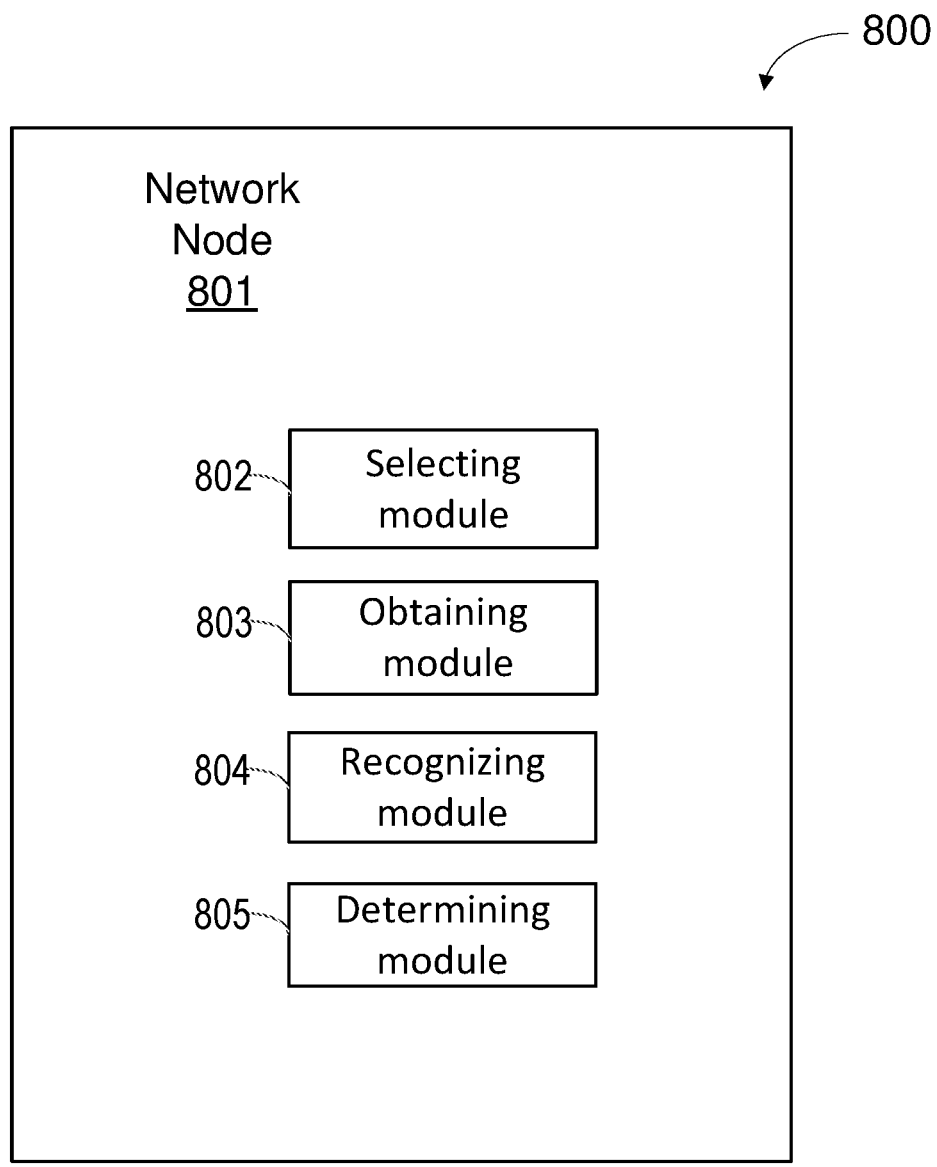
FIG. 8 illustrates a network node, according to some embodiments of the present disclosure.

FIG. 8 is a schematic diagram 800 of a network node 801 according to some embodiments of the present disclosure. The network node 801 can implement the functions of the network node 201 of FIG. 2 and the methods of FIGS. 4-6. The network node 801 can comprise or be implemented in the network node of a wireless communication network (such as network node 113) or in a radio access node (such as the radio access node 111, 112) of a wireless communications network.

The network node 801 comprises a selecting module 802, an obtaining module 803, recognizing module 804 and a determining module 805. The selecting module 802 can select a coverage area for a transmission point of a transmitter and request an image view of the coverage area. The obtaining module 803 can obtain an image view of the selected coverage area. The recognizing module 804 can recognize a morphology type from the image view using ML-based model(s). The determining module 805 can determine a RF propagation model for the selected coverage area based on the recognized morphology type. The determined RF propagation model can be configured to provide RF propagation parameters to the transmitter to control signals transmitted from the transmitter over the coverage area. In some embodiments the modules 802-805 correspond to various operations of method 400 of FIG. 4.

Thus, in some embodiments, a method provides for determining a Radio Frequency (RF) propagation model for a coverage area from an image view of the coverage area, wherein the method comprises selecting a coverage area for a transmission point of a transmitter and obtaining an image view of the selected coverage area. The method further provides for recognizing, from a plurality of morphology types, a morphology type for the selected coverage area from the obtained image view using a machine learning model; and determining a RF propagation model for the selected coverage area based on the recognized morphology type.

In some embodiments, the modules 802-805 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the network node 801 are implemented in software. In other embodiments, the modules of the network node 801 are implemented in hardware. In further embodiments, the modules of the network 801 are implemented in a combination of hardware and software. In some embodiments, the computer program can be provided on a carrier, where the carrier is one of an electronic signal, optical signal, radio signal or computer storage medium.

Figure 9:
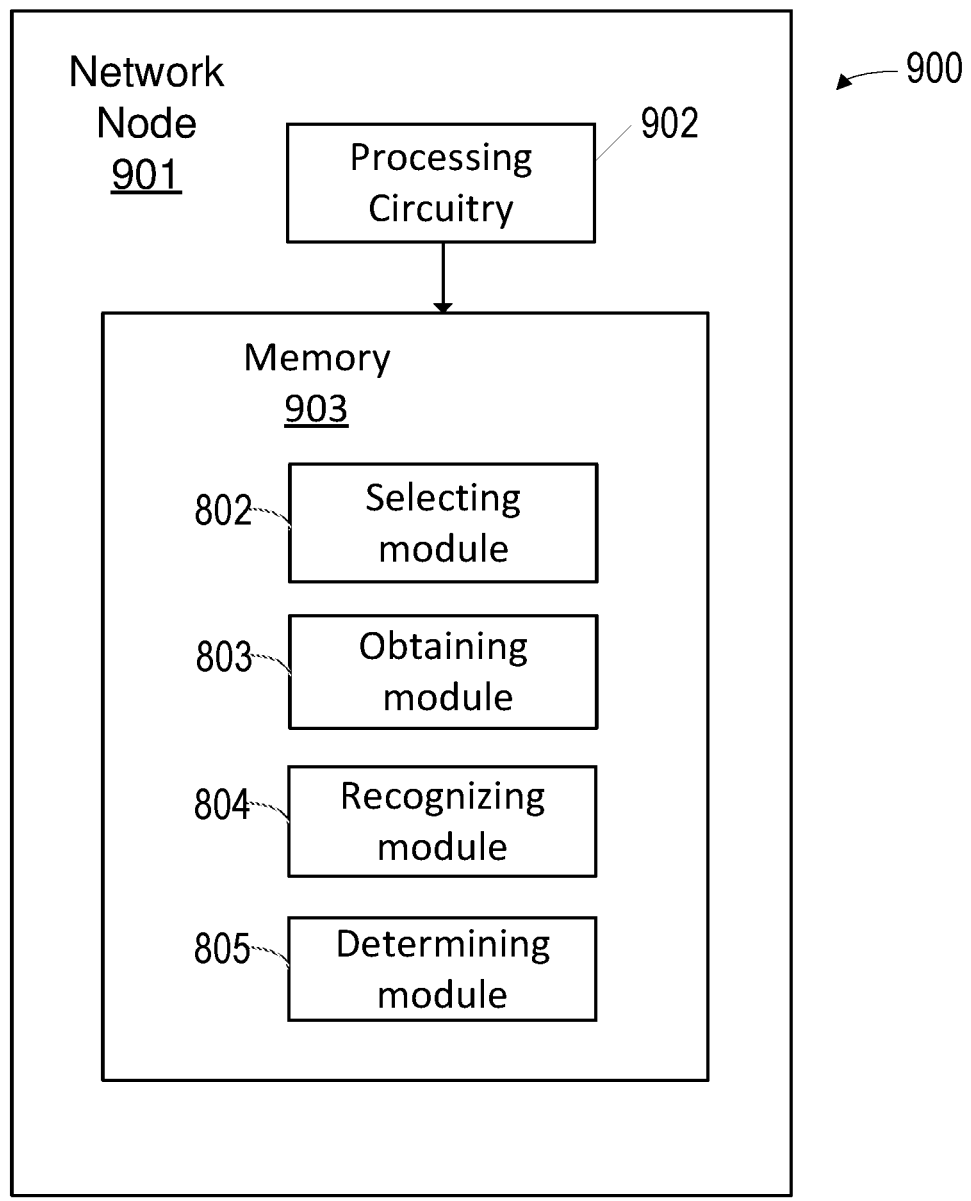
FIG. 9 illustrates another network node, according to some embodiments of the present disclosure.

FIG. 9 is a schematic diagram 900 of a network node 901 according to some embodiments of the present disclosure. The network node 901 can implement the functions of the network node 201 of FIG. 2 and the methods of FIGS. 4-6. The network node 901 can comprise or be implemented in the network node of a wireless communication network (such as network node 113) or in a radio access node (such as the radio access node 111, 112) of a wireless communications network. The network node 901 can be configured to implement the modules 802-805 of FIG. 8, wherein the instructions of the computer program for providing the functions of modules 802-805 reside in memory 903. The network node optionally can configure the transmitter, such as base station 206.

The network node 901 comprises processing circuitry (such as one or more processors) 902 and a non-transitory machine-readable medium, such as the memory 903. The processing circuitry 202 can comprise controller 202 of FIG. 2. The memory can store instructions which, when executed by the processing circuitry 902, configure the network node 901 to perform the methods described in the present disclosure. The memory can be a computer readable storage medium, such as, but not limited to, any type of disks including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

In some embodiments, a network node, of a wireless communication network, determines a Radio Frequency (RF) propagation model from an image view of the coverage area. The network node is configured to select a coverage area for a transmission point of a transmitter and obtain an image view of the selected coverage area. The network node is further configured to recognize, from a plurality of morphology types, a morphology type of the selected coverage area from the obtained image view using a machine learning model; and determine a RF propagation model for the selected coverage area based on the recognized morphology types.

Figure 10:
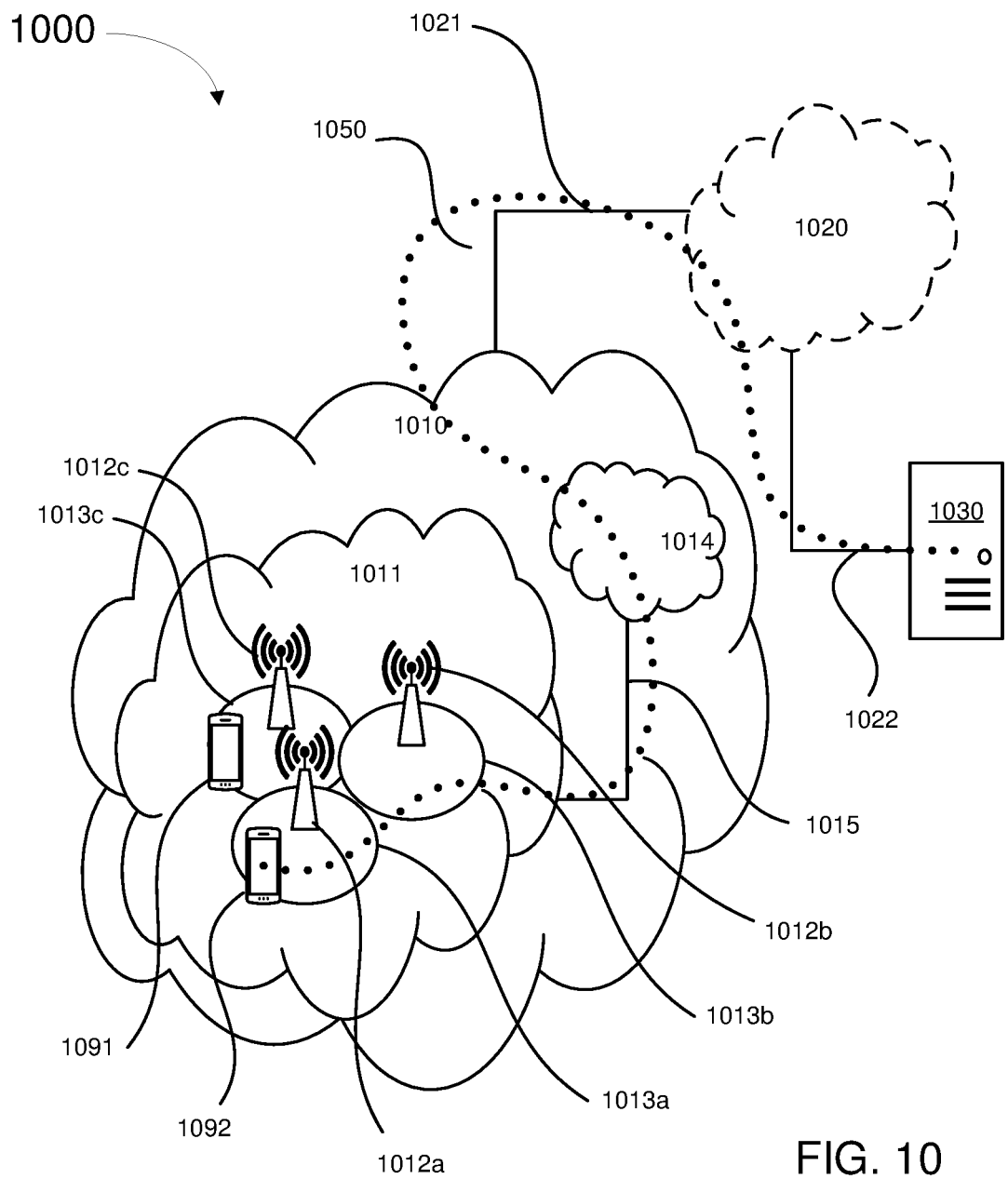
FIG. 10 illustrates a communication system, according to some embodiments of the present disclosure.

With reference to FIG. 10, in accordance with some embodiment, a communication system 1000 includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first terminal device 1091 located in coverage area 1013c is configured to wirelessly connect to, or be paged by, the corresponding base station 1012c. A second terminal device 1092 in coverage area 1013a is wirelessly connectable to the corresponding base station 1012a. While a plurality of terminal devices 1091, 1092 are illustrated in this example, the disclosed embodiments are equally applicable to a situation where a sole terminal device is in the coverage area or where a sole terminal device is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 enables connectivity between the connected terminal devices 1091, 1092 and host computer 1030. The connectivity may be described as an over-the-top (OTT) connection 1050. Host computer 1030 and the connected terminal devices 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected terminal device 1091. Similarly, base station 1012 need not be aware of the future routing of an outgoing uplink communication originating from the terminal device 1091 towards the host computer 1030.

The various techniques described in the present disclosure can be practiced in one or more network nodes of communication system 1000, including core network 1014 and base station 1012*a*, 1012*b*, 1012*c*.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method for determining a Radio Frequency (RF) propagation model for a coverage area from an image view of the coverage area, the method comprising:
   selecting the coverage area for a transmission point of a transmitter;
   obtaining the image view of the selected coverage area;
   quantifying, using a machine learning model, obstacles to RF propagation from the obtained image view based on obstacle types and obstacle density parameters for each obstacle type to generate a confidence score for selected combinations of obstacle types and obstacle density parameters to determine a morphology type, from a plurality of morphology types, for the selected coverage area; and
   determining the RF propagation model for the selected coverage area based on the morphology type.

2. The method according to claim 1, wherein the obtaining the image view of the selected coverage area comprises obtaining an aerial image with slant view at the transmission point.

3. The method according to claim 2, wherein the obtaining the image view further comprises receiving the aerial image with slant view from an image provider by providing geo coordinates of the selected coverage area with altitude, azimuth, and tilt angle.

4. The method according to claim 3, wherein the image provider is an aerial image provider, a satellite image provider, or a drone with a camera, or a combination thereof.

5. The method according to claim 1, wherein the obstacle types include one or more of buildings, trees, and foliage types.

6. The method of claim 5, wherein the obstacle density parameters of one or more obstacle types are quantified to different levels of density.

7. The method of claim 6, wherein the obstacle density parameters of the foliage types are determined from deciduous, coniferous, or mix of deciduous and coniferous foliage.

8. The method according to claim 1, wherein the machine learning model implements a convolutional neural network (CNN) or its variants which receives the image view as an input for quantifying the obstacles.

9. A network node, of a wireless communication network, to determine a Radio Frequency (RF) propagation model from an image view of a coverage area, the network node comprising:
   processing circuitry; and
   a memory comprising instructions which, when executed by the processing circuitry, cause the network node to:
      select the coverage area for a transmission point of a transmitter;
      obtain the image view of the selected coverage area;
      quantify, using a machine learning model, obstacles to RF propagation from the obtained image view based on obstacle types and obstacle density parameters for each obstacle type to generate a confidence score for selected combinations of obstacle types and obstacle density parameters to determine a morphology type, from a plurality of morphology types, for the selected coverage area; and
      determine the RF propagation model for the selected coverage area based on the morphology type.

10. The network node according to claim 9, wherein the obtained image view of the selected coverage area comprises an aerial image with slant view at the transmission point.

11. The network node according to claim 10 further to provide geo coordinates of the selected coverage area with altitude, azimuth, and tilt angle to an image provider to receive the aerial image with slant view from the image provider.

12. The network node according to claim 9, wherein the obstacle types include one or more of buildings, trees, and foliage types.

13. The network node of claim 12, wherein the obstacle density parameters of one or more obstacle types are quantified to different levels of density.

14. The network node of claim 13, wherein the obstacle density parameters of the foliage types is are determined from deciduous, coniferous, or mix of deciduous and coniferous foliage.

15. The network node according to claim 9, wherein the network node further configures the transmitter based on the determined RF propagation model to transmit in the selected coverage area.

16. A non-transitory machine-readable storage medium comprising instructions which, when executed by at least one processing circuitry of a network node of a wireless communication network, are capable of determining a Radio Frequency (RF) propagation model for a coverage area from an image view of the coverage area by performing operations comprising:

selecting the coverage area for a transmission point of a transmitter;

obtaining the image view of the selected coverage area;

quantifying, using a machine learning model, obstacles to RF propagation from the obtained image view based on obstacle types and obstacle density parameters for each obstacle type to generate a confidence score for selected combinations of obstacle types and obstacle density parameters to determine a morphology type, from a plurality of morphology types, for the selected coverage area; and determining the RF propagation model for the selected coverage area based on the morphology type.

* * * * *